Patented July 8, 1952

2,602,753

UNITED STATES PATENT OFFICE 2,602,753

CERAMIC DIELECTRICS COMPRISING ESSENTIALLY TITANIA

Jack Woodcock and John K. Paridge, Stourport-on-Severn, England, assignors to Steatite and Porcelain Products Limited and Dubilier Condenser Company (1925) Limited, corporations of Great Britain No Drawing. Application August 28, 1950, Serial No. 181,934. In Great Britain September 12, 1949

8 Claims. (Cl. 106—39)

This invention relates to ceramic dielectrics of the kind comprising mainly one or more of the titanates of the alkaline earth metals calcium, strontium and/or barium.

The use of these alkaline earth titanates as dielectric materials is now well known. Various additives to such materials also are known, for example fluxes such as borates or boro-silicates, magnesia, zirconia and thoria. One of the characteristics of the alkaline earth titanate dielectrics is their sometimes extra-ordinarily high permittivities within limited temperature ranges —i. e. permittivity "peaking" character, which for some purposes is undesirable. Various proposals have therefore been made for the addition of other materials to modify the permittivity temperature curves of these titanates.

According to the present invention we provide improved dielectric materials of the kind comprising mainly one or more of the alkaline earth titanates with minor amounts of thoria, and/or zirconia, characterised by the inclusion also of an oxide of one or more of the alkali-metals lithium, sodium or potassium.

Preferably the oxides of at least two of the alkali-metals are employed, a combination of lithium with either sodium or potassium being particularly beneficial. Of the three oxides, lithia is the most useful when used alone. The optimum range of alkali-metal content is from 0.1% to 3% as oxide, but slightly greater amounts, e. g. up to 5% may be tolerated.

Of the oxides essentially included as minor ingredients in the compositions, thoria is preferred. The thoria or zirconia may be present in amounts of 0.5-25%, and preferably is considerably in excess of the stoichiometric equivalent of the alkali-metal content, subject to the aforesaid limits. The alkali-metal oxide may be added to the mix as the carbonate or other salt convertible to the oxide on firing. Alternatively the alkali-metal oxide may be added in combination with titania or refractory oxide as preformed titanate, thorate, or zirconate. For certain purposes and in certain circumstances it has been found advantageous to add a fluorine-containing substance to the mix, and in such cases of course the alkali-metal fluorides are convenient substances for this purpose.

The chief advantage of the invention resides in the modification of the peaking character of the permittivity-temperature curves of the titanates, the "peak" being flattened and spread over a wider temperature range, and sometimes also displaced along the temperature scale. It would appear that the addition of alkali-metal oxide to the alkaline earth titanates alone does not produce this effect to any appreciable extent, and that the presence of certain other refractory oxides capable of combining with the alkali-metal is essential. We have found that whilst a combination of lithia and thoria is very satisfactory, and lithia and zirconia are also a useful combination, the most pre-eminent effect is produced by a combination of lithium and sodium thorates in the presence of a fluoride.

Table 1 illustrates by way of example various dielectric compositions in accordance with our invention, stated in terms of materials added to a mix to produce the desired composition in the fired body, whilst Table 2 indicates the electrical properties of the exemplary bodies.

Table 1

| Ingredients | Body No. Per Cent Composition |  |  |  |  |  |  |
|---|---|---|---|---|---|---|---|
|  | 1 | 2 | 3 | 4 | 5 | 6 | 7 |
| Barium Titanate | 91 | 96 | 96 | 97 | 90 | 94 | 94 |
| Calcium Titanate |  |  |  |  |  |  | 1 |
| Lithium Thorate | 3 | 3 | 3 |  |  | 3 | 3 |
| Sodium Thorate |  |  |  | 3 |  |  |  |
| Potassium Thorate |  |  |  |  |  | 3 |  |
| Lithium Fluoride |  |  | 1 |  |  |  |  |
| Sodium Fluoride | 2 | 1 |  |  |  |  |  |
| Thoria | 4 |  |  |  |  |  | 2 |
| Lithium Zirconate |  |  |  |  | 10 |  |  |

Table 2

|  | 1 | 2 | 3 | 4 | 5 | 6 | 7 |
|---|---|---|---|---|---|---|---|
| Permittivity (substantially constant over stated temperature range) | 3,000 10°–110° C. | 1,500 20°–128° C. | 4,000 0°–60° C. | 3,000 0°–60° C. | 6,500 0°–30° C. | 2,800 20°–60° and 2,500 70°–115° C. | 4,300 20°–60° C. |
| Power factor at 1 kc. (over same temperature range) | less than 2% | less than 1% | less than 2% | less than 2% | less than 2% | less than 1.5% | less than 2% |

The precise effect obtained varies somewhat according to the particular alkaline earth titanate or mixture of such titanates in use, and consequently for any given combination of titanates it will usually be necessary to ascertain what particular combination of alkali-metal and refractory oxides will yield the optimum or a particularly desired effect.

Hitherto it has been a widely held belief that the alkali-metal oxides should be rigorously excluded from dielectric compositions as being highly detrimental. It is therefore a matter for great surprise that the alkaline earth titanate bodies should prove exceptional in that not only are the alkali-metal oxides not detrimental, but on the contrary, in suitable circumstances as illustrated hereinbefore, definitely advantageous.

We claim:

1. A ceramic dielectric material comprising predominantly an alkaline earth titanate and containing an element from the group consisting of thorium and zirconium and an alkali metal from the group consisting of lithium, sodium and potassium, said element being present in 0.5 to 25% by weight of the ceramic when expressed as oxide and said alkali metal being present in 0.1 to 5% by weight of the ceramic when expressed as oxide.

2. A ceramic dielectric material comprising barium, titanium, thorium, lithium, and oxygen and having approximately the following analysis:

| | Per cent |
|---|---|
| Thorium oxide | 0.5 to 25 |
| Lithium oxide | 0.1 to 5 |
| Barium titanate | Remainder |

3. A ceramic dielectric material consisting of about 4% thoria, 2% sodium fluoride, 3% lithium thorate and the remainder barium titanate.

4. A ceramic dielectric material consisting of about 10% lithium zirconate and the remainder barium titanate.

5. A ceramic dielectric material comprising an alkaline earth metal, titanium, an element from the group consisting of thorium and zirconium, oxygen, and an alkali metal from the group consisting of lithium, sodium and potassium, and having approximately the following analysis:

| | Per cent |
|---|---|
| Oxide of said element | 0.5 to 25 |
| Oxide of said alkali metal | 0.1 to 5 |
| Alkaline earth metal titanate | Remainder |

6. A ceramic dielectric material consisting of about 1% calcium titanate, 3% lithium thorate, 2% thoria, and the remainder barium titanate.

7. A ceramic dielectric material consisting of about 3% lithium thorate, 1% lithium fluoride and the remainder barium titanate.

8. A ceramic dielectric material comprising predominantly barium titanate and containing lithium thorate, the content of the latter being between 0.1 and 3% when expressed as lithium oxide.

JACK WOODCOCK.
JOHN K. PARIDGE.

REFERENCES CITED

The following references are of record in the file of this patent:

UNITED STATES PATENTS

| Number | Name | Date |
|---|---|---|
| 2,398,088 | Ehlers et al. | Apr. 9, 1946 |

FOREIGN PATENTS

| Number | Country | Date |
|---|---|---|
| 625,516 | Great Britain | 1949 |